(12) United States Patent
Tanaka et al.

(10) Patent No.: US 11,196,066 B2
(45) Date of Patent: Dec. 7, 2021

(54) FUEL CELL SYSTEM (71) Applicant: TOYOTA JIDOSHA KABUSHIKI KAISHA, Toyota (JP)

(72) Inventors: Seiichi Tanaka, Nisshin (JP); Masashi Toida, Nagoya (JP); Hiroyuki Tsunekawa, Seto (JP); Shun Matsumoto, Toyota (JP); Tsuyoshi Maruo, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/148,122

(22) Filed: Oct. 1, 2018

(65) Prior Publication Data
US 2019/0165392 A1 May 30, 2019

(30) Foreign Application Priority Data

Nov. 28, 2017 (JP) .............................. JP2017-227544

(51) Int. Cl.
| | |
|---|---|
| *H01M 8/04313* | (2016.01) |
| *H01M 8/043* | (2016.01) |
| *H01M 8/04298* | (2016.01) |
| *H01M 8/04225* | (2016.01) |
| *H01M 8/04223* | (2016.01) |
| *H01M 8/04664* | (2016.01) |
| *H01M 8/0438* | (2016.01) |
| *H01M 8/04701* | (2016.01) |
| *H01M 8/04955* | (2016.01) |

(Continued)

(52) U.S. Cl.
CPC ... *H01M 8/04671* (2013.01); *H01M 8/04253* (2013.01); *H01M 8/04302* (2016.02); *H01M 8/04388* (2013.01); *H01M 8/04664* (2013.01); *H01M 8/04723* (2013.01); *H01M 8/04753* (2013.01); *H01M 8/04955* (2013.01); *H01M 2250/20* (2013.01)

(58) Field of Classification Search
None
See application file for complete search history.

(56) References Cited

U.S. PATENT DOCUMENTS

| 2004/0106026 A1* | 6/2004 | Fujita | ................ H01M 8/04302 |
| | | | 429/423 |
| 2007/0141418 A1* | 6/2007 | Ota | .................... H01M 8/04253 |
| | | | 429/413 |

FOREIGN PATENT DOCUMENTS

| JP | 2008-112702 A | | 5/2008 | |
| JP | 2008/198440 | * | 8/2008 | .............. H01M 8/04 |
| JP | 2008198440 A | | 8/2008 | |

(Continued)

OTHER PUBLICATIONS

English translation of JP 2008/198440 (Year: 2008).*
English translation of JP 2009/170295 (Year: 2009).*

*Primary Examiner* — Yoshitoshi Takeuchi
(74) *Attorney, Agent, or Firm* — Dickinson Wright, PLLC (57) ABSTRACT

Provided is a fuel cell system that can effectively suppress clogging of a pipe due to freezing of water in a fuel gas supply system thereof without the need for halting the operation of the fuel cells, and thus is highly reliable. When possible freezing of water is detected or presumed to be present downstream of an injector, the amount of a fuel gas to be supplied from a circulation pump that is disposed in a circulation channel is relatively increased compared to the amount of the fuel gas to be supplied from the injector.

6 Claims, 4 Drawing Sheets (51) Int. Cl.
*H01M 8/04746* (2016.01)
*H01M 8/04302* (2016.01)

(56) References Cited

FOREIGN PATENT DOCUMENTS

| | | | | |
|---|---|---|---|---|
| JP | 2008-218164 A | 9/2008 | | |
| JP | 2009/170295 | * 7/2009 | .............. | H01M 8/04 |
| JP | 2009170295 A | 7/2009 | | |

* cited by examiner

FUEL CELL SYSTEM

CROSS REFERENCE TO RELATED APPLICATIONS

The present application claims priority from Japanese patent application JP 2017-227544 filed on Nov. 28, 2017, the content of which is hereby incorporated by reference into this application.

BACKGROUND

Technical Field

The present disclosure relates to a fuel cell system.

There have conventionally been known fuel cell systems including fuel cells (a fuel cell stack) that generate electricity through electrochemical reactions of reactant gases, between an oxidant gas such as air and a fuel gas such as hydrogen.

In such a fuel cell system, water is produced while electricity is generated, and if the produced water remains in the fuel cells after electricity generation is halted, it may freeze when the ambient temperature decreases, for example, thereby reducing the efficiency of the next electricity generation.

For example, a fuel gas supply system that is adapted to supply a fuel gas such as hydrogen to the fuel cells includes a fuel gas supply source (or a hydrogen tank) that stores a high-pressure fuel gas, a fuel gas supply channel (pipe) that is adapted to supply a fuel gas in the fuel gas supply source to the fuel cells, a circulation channel that is adapted to return a fuel off-gas (or an unconsumed fuel gas) discharged from the fuel cells to the fuel gas supply channel, and the like, and the fuel gas supply channel (specifically, a portion upstream of a portion where the fuel gas supply channel and the circulation channel merge) is provided with an injector that is adapted to supply the fuel gas to the fuel cells by adjusting the flow rate and pressure of the fuel gas, and the like. In such a fuel gas supply system of the fuel cell system, water contained in the fuel gas discharged from the fuel cells and then supplied to the fuel gas supply channel through the circulation channel may freeze in a pipe (that is, in a portion downstream of the injector) that connects the injector and the fuel cells due to, for example, a decrease in the ambient temperature, thereby causing clogging of the pipe.

Thus, in order to prevent a reduction in the efficiency caused by such freezing, there has been proposed a technique of performing scavenging treatment (or purge treatment) by supplying a dry gas to fuel cells immediately after electricity generation of the fuel cells is halted, so as to discharge in advance water that remains in the fuel cells and that is stuck to the pipe and the like of the fuel cell system (see, for example, JP 2008-218164 A).

Background Art

However, in the background art described in JP 2008-218164 A or the like, for performing scavenging treatment, the operation of the fuel cells needs to be halted, and further, discharging water (ice) that has once frozen in a low-temperature environment to the outside is difficult to perform.

The present disclosure has been made in view of the aforementioned problems, and provides a fuel cell system that can effectively suppress clogging of a pipe due to freezing of water in a fuel gas supply system thereof without the need for halting the operation of the fuel cells, and thus is highly reliable.

SUMMARY

In order to solve the aforementioned problems, according to the present disclosure, there is provided a fuel cell system that includes fuel cells, a fuel gas supply channel adapted to supply a fuel gas to the fuel cells, a fuel supply device adapted to supply the fuel gas to the fuel cells through the fuel gas supply channel, a circulation channel adapted to circulate a fuel off-gas discharged from the fuel cells to the fuel gas supply channel, a circulation pump disposed in the circulation channel and adapted to pressure-feed the fuel off-gas to the fuel gas supply channel so as to be circulated therein, and a control unit adapted to control operation of at least one of the fuel supply device or the circulation pump, in which when freezing of water is presumed to be present downstream of the fuel supply device, the control unit relatively increases the proportion of the amount of the fuel gas to be supplied from the circulation pump to the amount of the fuel gas to be supplied from the fuel supply device.

In some embodiments, a pressure sensor is disposed downstream of the fuel supply device and upstream of a portion where the fuel gas supply channel and the circulation channel merge in the fuel gas supply channel, and the control unit is adapted to presume that freezing of water is present downstream of the fuel supply device from the degree of an increase in the pressure obtained from the pressure sensor.

In some embodiments, when freezing of water is presumed to be present downstream of the fuel supply device, the control unit increases the amount of the fuel gas to be supplied from the circulation pump, and when clogging due to freezing of water is further presumed to be present downstream of the fuel supply device, the control unit halts operation of the fuel supply device.

In some embodiments, when freezing of water is presumed to be present downstream of the fuel supply device, the control unit increases a target value for a refrigerant temperature of a refrigerant to be supplied to the fuel cells.

In some embodiments, the fuel gas supply channel and the circulation channel are connected via a T-shaped connecting pipe, such that the circulation channel is orthogonal to the fuel gas supply channel, and the fuel supply device is disposed upstream of the portion where the fuel gas supply channel and the circulation channel merge in the fuel gas supply channel.

According to the present disclosure, since the fuel gas supplied from the circulation pump that is disposed in the circulation channel is usually warmer than the fuel gas supplied from the fuel supply device that is disposed in the fuel gas supply channel, when possible freezing of water is detected or presumed to be present downstream of the fuel supply device, the amount of the fuel gas to be supplied from the circulation pump that is disposed in the circulation channel is relatively increased compared to the amount of the fuel gas to be supplied from the fuel supply device, so that frozen portions can be effectively warmed, thereby being able to effectively suppress the clogging of the pipe due to freezing of water.

Further, with the fuel gas supply channel and the circulation channel connected via the T-shaped connecting pipe, the fuel gas from the circulation channel can be made to efficiently flow (in a larger amount) toward the fuel supply device that is disposed upstream of the portion where the fuel gas supply channel and the circulation channel merge, thereby being able to further effectively suppress the clogging of the pipe due to freezing of water.

DETAILED DESCRIPTION

The configuration of the present disclosure will be described below in detail based on an example of an embodiment shown in the drawings. As an example of the present disclosure, fuel cells or a fuel cell system including them to be mounted on a fuel cell vehicle will be described, but the range of application of the present disclosure is not limited thereto.

[System Configuration of a Fuel Cell System]

Figure 1:
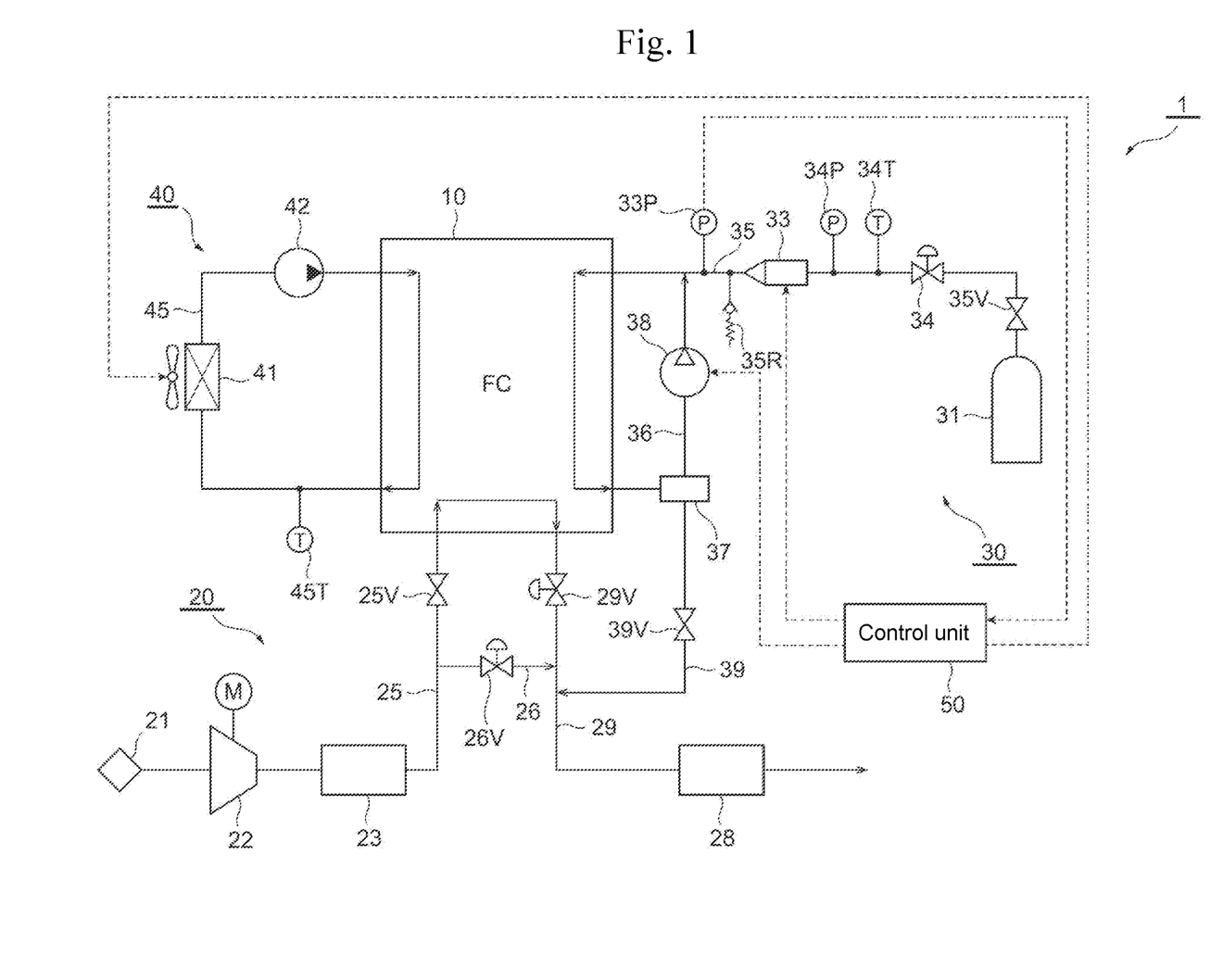
FIG. 1 is a system configuration diagram of a fuel cell system according to the present disclosure.

First, the system configuration of the fuel cell system with fuel cells according to the present disclosure will be outlined with reference to FIG. 1.

A fuel cell system 1 shown in FIG. 1 includes, for example, fuel cells (a fuel cell stack) 10 formed by stacking a plurality of fuel cells, each cell being a unit cell, an oxidant gas supply system 20 that is adapted to supply an oxidant gas such as air to the fuel cells 10, a fuel gas supply system 30 that is adapted to supply a fuel gas such as hydrogen to the fuel cells 10, a refrigerant supply system 40 that is adapted to adjust the temperature of the fuel cells 10 by flowing a refrigerant such as cooling water, and a control unit (or a control ECU) 50 that is adapted to integrally control the overall system.

For example, each of the fuel cells 10 as a polymer electrolyte fuel cell has a membrane electrode assembly (MEA) that includes an electrolyte membrane with ion permeability and anode-side catalyst layer (anode electrode) and cathode-side catalyst layer (cathode electrode) sandwiching the electrolyte membrane therebetween. The MEA has gas diffusion layers (GDLs) on opposite sides thereof for providing a fuel gas or an oxidant gas to the MEA and for collecting electricity generated through electrochemical reactions. Such a membrane electrode assembly having GDLs on opposite sides thereof is referred to as a MEGA (Membrane Electrode & Gas Diffusion Layer Assembly), and the MEGA is sandwiched between a pair of separators. Herein, the MEGA is a power generation portion of the fuel cell. If no gas diffusion layers are provided, the MEA is the power generation portion of the fuel cell.

The oxidant gas supply system 20 includes, for example, an oxidant gas supply channel (pipe) 25 for supplying an oxidant gas to the fuel cells 10 (or the cathode electrodes thereof), an oxidant gas discharge channel (pipe) 29 for discharging, from the fuel cells 10, an oxidant off-gas that is produced after the oxidant gas is used for an electrochemical reaction in each fuel cell, and a bypass channel 26 for circulating the oxidant gas supplied through the oxidant gas supply channel 25 to the oxidant gas discharge channel 29 by bypassing the fuel cells 10. Each channel of the oxidant gas supply system 20 may be made of, for example, a rubber hose or a metal pipe.

The oxidant gas supply channel 25 is provided with an air cleaner 21, an air compressor (turbo compressor) (hereinafter simply referred to as a compressor) 22, an intercooler 23, and the like that are arranged in this order from the upstream side, and the oxidant gas discharge channel 29 is provided with a muffler 28 and the like. It should be noted that the oxidant gas supply channel 25 (or the air cleaner 21 thereof) is provided with, for example, an atmospheric pressure sensor and/or an air flow meter (which are not shown).

In the oxidant gas supply channel 25, the air cleaner 21 removes dust in the oxidant gas (such as air) to be taken in from the atmosphere.

The compressor 22 compresses the oxidant gas introduced via the air cleaner 21 and pressure-feeds the compressed oxidant gas to the intercooler 23.

When the oxidant gas that has been pressure-fed and introduced from the compressor 22 passes through the intercooler 23, the intercooler 23 cools the oxidant gas through heat exchange with a refrigerant, for example, and supplies the cooled oxidant gas to the fuel cells 10 (or the cathode electrodes thereof).

Further, the oxidant gas supply channel 25 is provided with an inlet valve 25V for blocking an oxidant gas flow between the intercooler 23 and the fuel cells 10. It should be noted that the inlet valve 25V may be a check valve that is configured to open by the flow of the oxidant gas moving from the intercooler 23 toward the fuel cells 10 and thus allow the passage of the oxidant gas, and to close by the flow of the oxidant gas moving from the fuel cells 10 toward the intercooler 23 and thus block the passage of the oxidant gas.

The bypass channel 26 is connected to the oxidant gas supply channel 25 (or the intercooler 23 thereof or the downstream of the intercooler 23) at one end thereof, and to the oxidant gas discharge channel 29 at the other end thereof. In other words, the bypass channel 26 branches from the oxidant gas supply channel 25 (or the intercooler 23 thereof or the downstream of the intercooler 23) toward the oxidant gas discharge channel 29 and is connected thereto. In the bypass channel 26, the oxidant gas that has been pressure-fed by the compressor 22, cooled by the intercooler 23, and then discharged flows toward the oxidant gas discharge channel 29 by bypassing the fuel cells 10. The bypass channel 26 is provided with a bypass valve 26V for regulating the flow rate of the oxidant gas flowing through the bypass channel 26 by blocking the oxidant gas flowing toward the oxidant gas discharge channel 29.

In the oxidant gas discharge channel 29, the muffler 28 separates the oxidant off-gas (exhaust gas) flowing through the oxidant gas discharge channel 29 into, for example, gas and liquid phases so as to be discharged to the outside.

Further, the oxidant gas discharge channel 29 is provided with a pressure regulating valve 29V for regulating the back pressure of the oxidant gas supplied to the fuel cells 10. The aforementioned bypass channel 26 is connected to the downstream side of the pressure regulating valve 29V.

Meanwhile, the fuel gas supply system 30 includes, for example, a fuel gas supply source 31 such as a hydrogen tank that stores a high-pressure fuel gas such as hydrogen, a fuel gas supply channel (pipe) 35 for supplying the fuel gas fed from the fuel gas supply source 31 to the fuel cells 10 (or the anode electrodes thereof), a circulation channel 36 for refluxing a fuel off-gas (unconsumed fuel gas) discharged from the fuel cells 10 to the fuel gas supply channel 35, and a fuel gas discharge channel (pipe) 39, which branches from the circulation channel 36, for discharging the fuel off-gas inside the circulation channel 36 to the outside (releasing to the air). Each channel of the fuel gas supply system 30 may be made of, for example, a rubber hose or a metal pipe.

The fuel gas supply channel 35 is provided with a shut-off valve 35V that is adapted to block the fuel gas flowing toward the fuel cells 10 by opening and closing the fuel gas supply channel 35, a regulator 34 that is adapted to regulate (reduce) the pressure of the fuel gas flowing through the fuel gas supply channel 35, and an injector (or a fuel supply device) 33 that is adapted to supply the fuel gas with its pressure regulated to the fuel cells 10, the shut-off valve 35V, regulator 34, and injector 33 being positioned in this order from the upstream side in the fuel gas supply channel 35. When the shut-off valve 35V is opened, a high-pressure fuel gas that is stored in the fuel gas supply source 31 flows out to the fuel gas supply channel 35 and is supplied to the fuel cells 10 (or the anode electrodes thereof) with its pressure regulated (reduced) by the regulator 34 and injector 33.

Further, a pressure sensor (or a primary side pressure sensor) 34P and a temperature sensor 34T that are adapted to respectively detect the pressure and the temperature of the fuel gas are provided in portions upstream of the injector 33 (specifically, between the regulator 34 and the injector 33) in the fuel gas supply channel 35. In addition, a pressure sensor (or a secondary side pressure sensor) 33P that is adapted to detect the pressure of the fuel gas (the pressure at the outlet of the injector 33) and a relief valve 35R that is adapted to open when the pressure inside the fuel gas supply channel 35 has reached a predetermined operation pressure are provided in portions downstream of the injector 33 and upstream of the portion (or a connecting portion) where the fuel gas supply channel 35 and the circulation channel 36 merge.

The circulation channel 36 is provided with a gas-liquid separator 37, a circulation pump (also referred to as a hydrogen pump) 38, and the like that are arranged in this order from the upstream side (the side of the fuel cells 10).

The gas-liquid separator 37 separates the fuel gas (such as hydrogen), which contains produced water therein, flowing through the circulation channel 36 into gas and liquid and stores them. A fuel gas discharge channel 39 is provided so as to branch from the gas-liquid separator 37.

The circulation pump 38 is adapted to pressure-feed (pressurize) the fuel off-gas that has been separated into gas and liquid by the gas-liquid separator 37 to the fuel gas supply channel 35 (or the downstream side of the injector 33 thereof) to be circulated therein.

The fuel gas discharge channel 39 is provided with a purge valve 39V that is adapted to open and close the fuel gas discharge channel 39 so as to discharge the produced water, which has been separated from the fuel gas by the gas-liquid separator 37, and some of the fuel off-gas discharged from the fuel cells 10.

The fuel off-gas discharged through the adjustment of opening and closing of the purge valve 39V of the fuel gas discharge channel 39 is mixed with the oxidant off-gas flowing through the oxidant gas discharge channel 29 and then released to the air outside via the muffler 28.

In the fuel cell system 1 with the aforementioned configuration, electricity is generated through electrochemical reactions between an oxidant gas such as air supplied to the fuel cells 10 (or the cathode electrodes thereof) through the oxidant gas supply system 20 and a fuel gas such as hydrogen supplied to the fuel cells 10 (or the anode electrodes thereof) through the fuel gas supply system 30.

The refrigerant supply system 40 includes, for example, a refrigerant channel (pipe) 45 that connects an inlet and an outlet of a cooling channel that is disposed inside the fuel cells 10 so as to circulate a refrigerant therein.

The refrigerant channel 45 is provided with a radiator 41 that is adapted to cool the refrigerant discharged from the fuel cells 10, a refrigerant pump 42 that is adapted to suck the refrigerant in the refrigerant channel 45 from the outlet side and eject it toward the inlet side, and a refrigerant temperature sensor 45T that is adapted to detect the refrigerant temperature inside the refrigerant channel 45.

The control unit 50 is adapted to control operations of various devices within the system upon receiving control information from the various devices disposed in a vehicle. The control unit 50 is adapted, for example, to detect the amount of operation of an acceleration operation device (such as an accelerator) disposed in the vehicle and calculate electricity (or the amount of electric power required) to be drawn out from the fuel cells 10, so that a fuel gas and an oxidant gas in amounts corresponding to the amount of electric power to be generated are supplied to the fuel cells 10 through the fuel gas supply system 30 and the oxidant gas supply system 20, respectively.

The control unit 50 includes a computer system (not shown), which includes a CPU, ROM, RAM, HDD, input/output interface, display, and the like. In the computer system, various control operations are realized such that various control programs that are recorded in the ROM are read and executed by the CPU.

Figure 2:
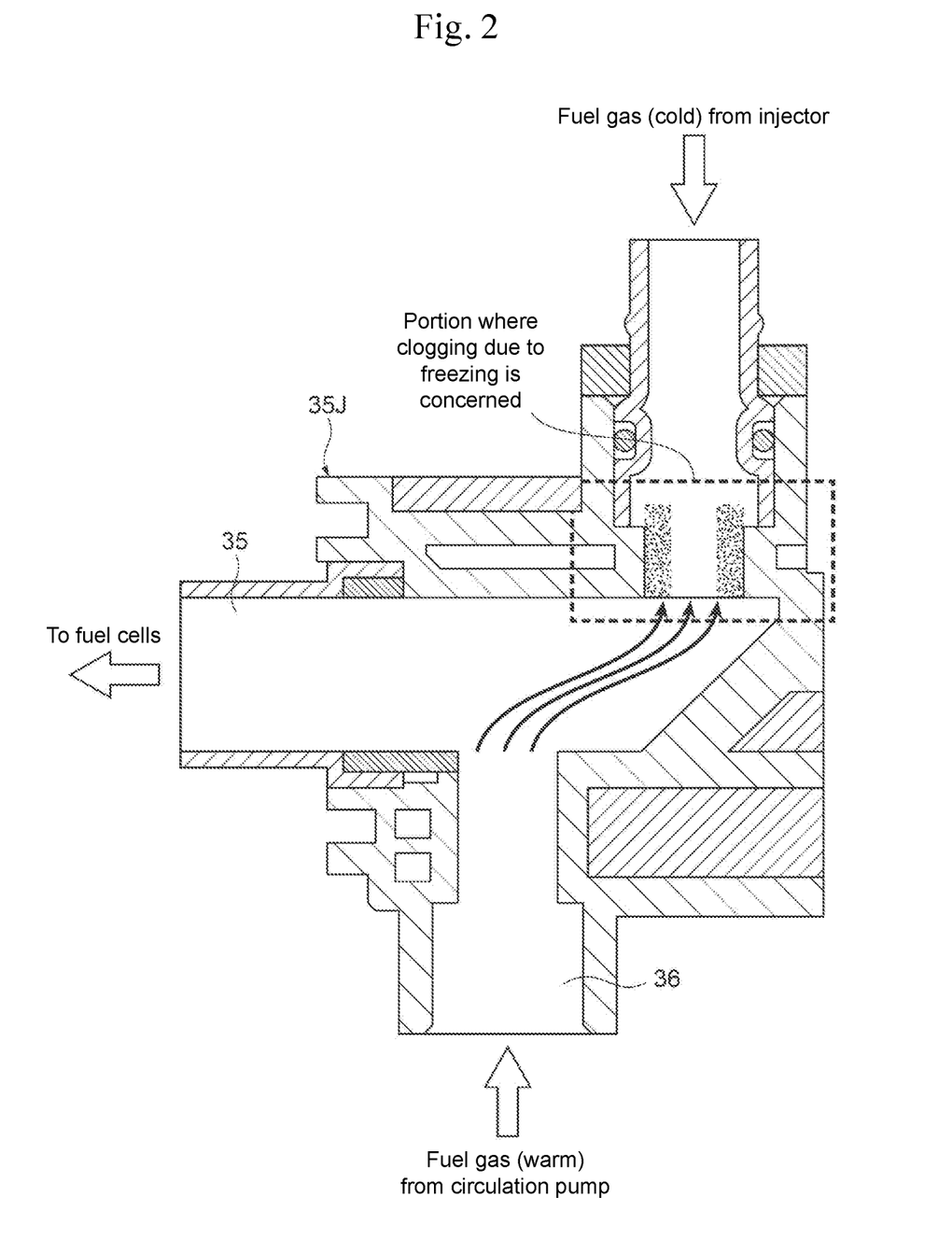
FIG. 2 is a cross-sectional view of the main portion of a T-shaped connecting pipe that is disposed in a portion where a fuel gas supply channel and a circulation channel shown in FIG. 1 merge.

Herein, in the present embodiment, as shown in FIG. 2, the fuel gas supply channel 35 and the circulation channel 36 are connected with each other via a T-shaped connecting pipe 35J. Specifically, the T-shaped connecting pipe 35J is provided in the portion (or the connecting portion) where the fuel gas supply channel 35 and the circulation channel 36 merge, such that the circulation channel 36 is orthogonal to the fuel gas supply channel 35. An end of the T-shaped connecting pipe 35J on the upstream side in the fuel gas supply channel 35 (or an end portion on the upstream side of the portion where the fuel gas supply channel 35 and the circulation channel 36 merge) is coupled to the injector 33, an end of the T-shaped connecting pipe 35J on the downstream side in the fuel gas supply channel 35 (or an end portion on the downstream side of the portion where the fuel gas supply channel 35 and the circulation channel 36 merge) is coupled to the fuel cells 10, and an end of the T-shaped connecting pipe 35J on the side of the circulation channel 36 is coupled to the circulation pump 38. That is, in the present example, the fuel cells 10 and the injector 33, which are separately provided (provided as separate parts), are coupled with each other via the T-shaped connecting pipe 35J. Further, in the present example, the injector 33 is orthogonally coupled to the fuel gas supply channel 35 inside the T-shaped connecting pipe 35J at the end of the T-shaped connecting pipe 35J on the upstream side in the fuel gas supply channel 35. That is, in the present example, the fuel gas from the injector 33 and the fuel gas (or the fuel off-gas) from the circulation channel 36 (or the circulation pump 38 disposed therein) are supplied to the fuel gas supply channel 35 inside the T-shaped connecting pipe 35J at offset positions and from directions perpendicular to the fuel gas supply channel 35.

Because of the aforementioned configuration, a jet flow (or steam) of the fuel gas (or the fuel off-gas) from the circulation channel 36 bumps against the wall surface inside the T-shaped connecting pipe 35J and some of the fuel gas flows toward the end of the T-shaped connecting pipe 35J on the upstream side (on the side of the injector 33) in the fuel gas supply channel 35 (see the arrows in FIG. 2). Since the fuel gas supplied from the injector 33 is a cold gas with a temperature below zero degrees Celsius, the steam of the fuel gas that has flowed toward the upstream side is cooled, and then freezes on the inner wall of the fuel gas supply channel 35 on the side of the injector 33. The frozen fuel gas may accumulate over the course of the operation of the fuel cells 10, whereby clogging due to freezing may occur.

In the present embodiment, in order to prevent freezing or clogging due to freezing of the aforementioned T-shaped connecting pipe 35J (that is, the pipe that connects the injector 33 in the fuel gas supply system 30 and the fuel cells 10), the control unit 50 is adapted to control the operations of the injector 33 that is disposed in the fuel gas supply channel 35, the circulation pump 38 that is disposed in the circulation channel 36, the radiator 41 that is disposed in the refrigerant channel 45, and the like, using detection values (of the pressure of the fuel gas) obtained from the pressure sensor (or the secondary side pressure sensor) 33P that is disposed downstream of the injector 33.

[Control of Fuel Cell System by Control Unit]

Figure 3:
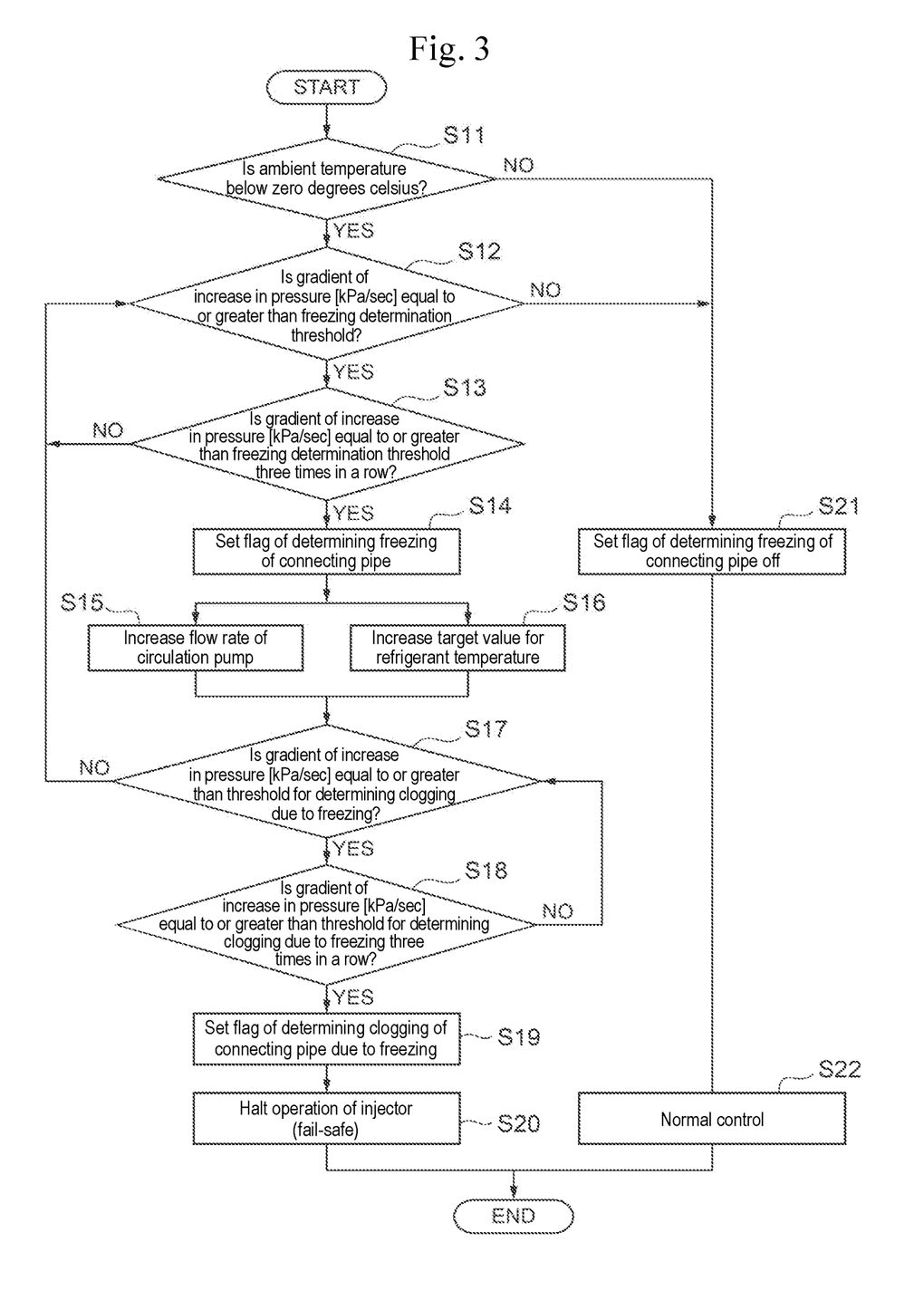
FIG. 3 is a flowchart that explains control of a control unit shown in FIG. 1.
Figure 4:
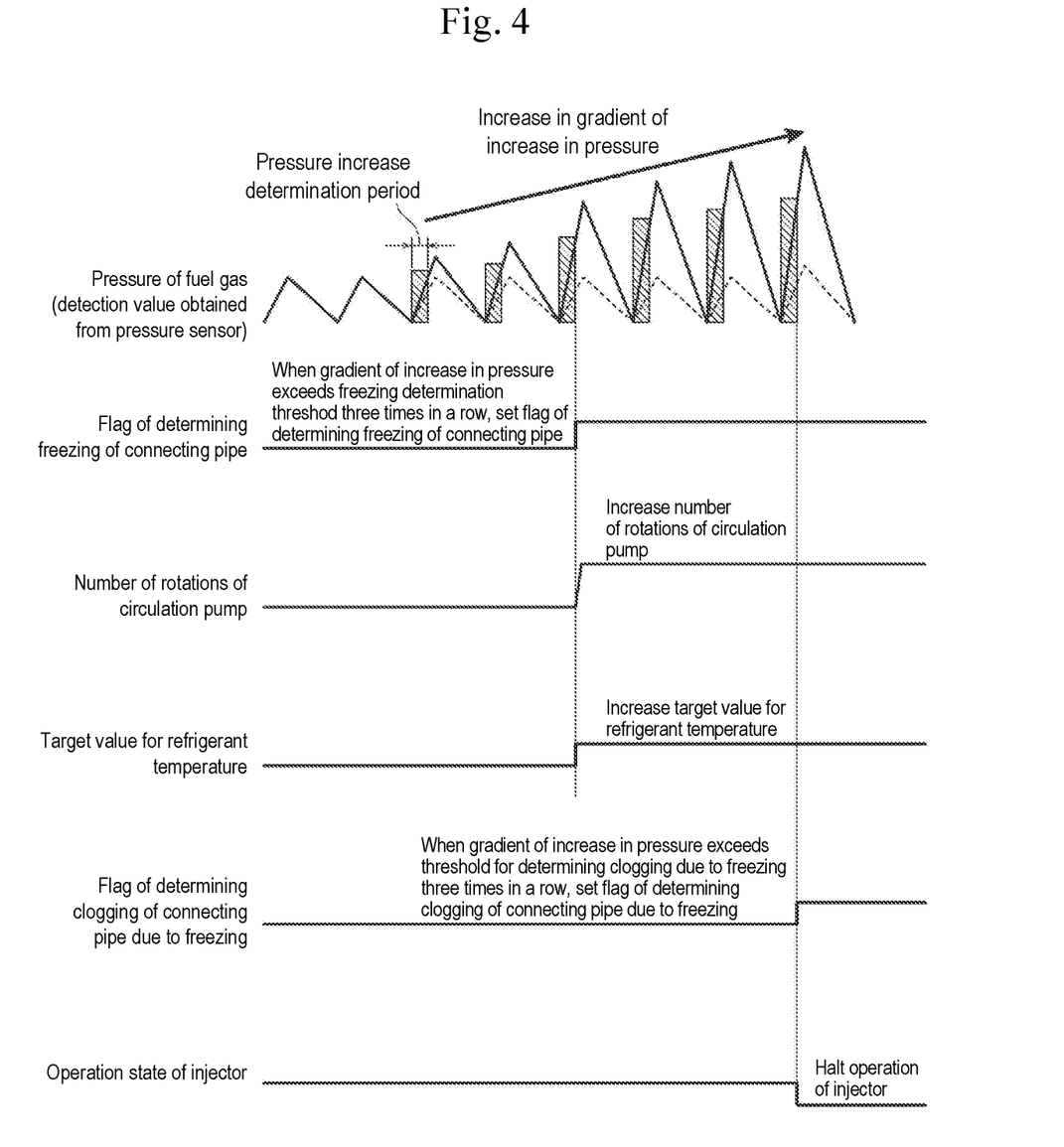
FIG. 4 is a time chart that chronologically shows the pressure of a fuel gas (or a detection value obtained from a pressure sensor), a flag of determining freezing of a connecting pipe, the number of rotations of a circulation pump, a target value for a refrigerant temperature, a flag of determining clogging of a connecting pipe due to freezing, and the operation state of an injector.

With reference to the flowchart of FIG. 3 and the time chart of FIG. 4, the aforementioned control (control of preventing freezing or clogging due to freezing) of the fuel cell system 1 by the control unit 50 is specifically described below.

The control unit 50 first determines whether the ambient temperature is below zero degrees Celsius (S11).

If the ambient temperature is determined to be below zero degrees Celsius (S11: Yes), the control unit 50 determines whether the gradient of a pressure increase (the degree of the pressure increase during a predetermined pressure increase determination period) calculated from detection values (of pressure) obtained from the pressure sensor 33P that is disposed downstream of the injector 33 is equal to or greater than a predetermined freezing determination threshold (S12). Further, if the gradient of the pressure increase is determined to be equal to or greater than the freezing determination threshold (S12: Yes), the control unit 50 determines whether the gradient of the pressure increase is equal to or greater than the freezing determination threshold three times in a row (S13). In this manner, the control unit 50 estimates freezing while avoiding erroneous determination.

If the gradient of the pressure increase is determined to be equal to or greater than the freezing determination threshold three times in a row (S13: Yes), a flag of determining freezing of the connecting pipe is set (S14).

Based on the information that the flag has been set in S14, the control unit 50 increases the number of rotations of the circulation pump 38 so as to increase the flow rate (or the amount of gas) (S15) and also controls the radiator 41 and the like to increase the target value for the refrigerant temperature of a refrigerant that flows through the fuel cells 10 (S16). In this manner, the control unit 50 increases the amount of heat of the fuel gas (or the fuel off-gas) in the circulation channel 36, thereby avoiding the freezing of the aforementioned T-shaped connecting pipe 35J.

It should be noted that herein, the flow rate (or the amount) of the fuel gas to be supplied from the circulation pump 38 is increased (relative to the flow rate (or the amount) of the fuel gas to be supplied from the injector 33) by increasing the number of rotations of the circulation pump 38, but, for example, the proportion of the amount of the fuel gas to be supplied from the circulation pump 38 to the amount of the fuel gas to be supplied from the injector 33 may be relatively increased by decreasing the flow rate (or the amount) of the fuel gas to be supplied from the injector 33 through control of the flow rate (or the amount) of the fuel gas on the side of the injector 33.

The control unit 50 then determines whether the gradient of the pressure increase is equal to or greater than a predetermined threshold for determining clogging due to freezing (S17). Further, if the gradient of the pressure increase is determined to be equal to or greater than the threshold for determining clogging due to freezing (S17: Yes), the control unit 50 determines whether the gradient of the pressure increase is equal to or greater than the threshold for determining clogging due to freezing three times in a row (S18).

If the gradient of the pressure increase is determined to be equal to or greater than the threshold for determining clogging due to freezing three times in a row (S18: Yes), a flag of determining clogging of the connecting pipe due to freezing is set (S19).

Based on the information that the flag has been set in S19, the control unit 50 halts (fail-safe) the operation of the injector 33 (S20). In this manner, a decrease in the amount of heat caused by the fuel gas supplied from the injector 33 is suppressed, thereby avoiding the clogging due to freezing of the aforementioned T-shaped connecting pipe 35J.

It should be noted that if the ambient temperature is determined not to be below zero degrees Celsius (S11: No), or the gradient of the pressure increase is determined not to be equal to or greater than the freezing determination threshold (S12: No), the flag of determining freezing of the connecting pipe is set off (S21) and normal control is performed (S22).

In the aforementioned manner, the control unit 50 detects the gradient of the increase in the pressure obtained from the pressure sensor 33P that is disposed downstream of the injector 33 during operation under a temperature below zero degrees Celsius, and if freezing of water is presumed to be present downstream of the injector 33, the control unit 50 increases the flow rate of the fuel gas in the circulation pump 38 or increases the target value for the refrigerant temperature, thereby increasing the amount of heat of the fuel gas (or the fuel off-gas) in the circulation channel 36, thereby avoiding the clogging due to freezing of the T-shaped connecting pipe 35J. Further, if the control unit 50 determines that it is impossible to control the gradient of the pressure increase, it halts the operation of the injector 33 before the relief pressure is reached, thereby halting the supply of a cold gas to suppress the decrease in the amount of heat caused by the fuel gas supplied from the injector 33, so as to avoid the clogging due to freezing of the T-shaped connecting pipe 35J.

As described above, in the fuel cell system 1 of the present embodiment, since the fuel gas supplied from the circulation pump 38 that is disposed in the circulation channel 36 is usually warmer than the fuel gas supplied from the injector (or the fuel supply device) 33 that is disposed in the fuel gas supply channel 35, when possible freezing of water is detected or presumed to be present downstream of the injector 33, the amount of the fuel gas to be supplied from the circulation pump 38 that is disposed in the circulation channel 36 is relatively increased compared to the amount of the fuel gas to be supplied from the injector 33 (that is, the proportion of the amount of the fuel gas to be supplied from the circulation pump 38 to the amount of the fuel gas to be supplied from the injector 33 is relatively increased), so that frozen portions can be effectively warmed, thereby being able to effectively suppress the clogging of the pipe due to freezing of water.

Further, with the fuel gas supply channel 35 and the circulation channel 36 connected via the T-shaped connecting pipe 35J, the fuel gas from the circulation channel 36 can be made to efficiently flow (in a larger amount) toward the injector 33 that is disposed upstream of the portion where the fuel gas supply channel 35 and the circulation channel 36 merge, thereby being able to further effectively suppress the clogging of the pipe due to freezing of water.

It should be noted that in the aforementioned embodiment, the injector 33 has been described as an example of the fuel supply device that is adapted to supply a fuel gas to the fuel cells 10, but an ejector may also be used as the fuel supply device that is adapted to discharge and supply the fuel gas supplied from the fuel gas supply source 31 to the fuel cells 10.

Further, in the aforementioned embodiment, freezing of water or clogging due to freezing of water in a portion downstream of the injector 33 is presumed to be present from the degree of the increase in the pressure obtained from the pressure sensor 33P that is disposed downstream of the injector 33, but it does without saying that freezing of water or clogging due to freezing of water in a portion downstream of the injector 33 may also be presumed to be present from, for example, the temperature of a pipe (such as the T-shaped connecting pipe 35J) on the downstream side of the injector 33, the ambient temperature, and the like.

Although the embodiment of the present disclosure has been described in detail with reference to the drawings, the specific configuration is not limited thereto, and any design changes that may occur within the spirit and scope of the present disclosure are all included in the present disclosure.

DESCRIPTION OF SYMBOLS

1 Fuel cell system
10 Fuel cells (fuel cell stack)
20 Oxidant gas supply system
30 Fuel gas supply system
33 Injector (fuel supply device)
33P Pressure sensor (secondary side pressure sensor)
35 Fuel gas supply channel (pipe)
35J T-shaped connecting pipe
35R Relief valve
36 Circulation channel
37 Gas-liquid separator
38 Circulation pump
40 Refrigerant supply system
41 Radiator
42 Refrigerant pump
45 Refrigerant channel
50 Control unit

What is claimed is:

1. A fuel cell system comprising:
   a fuel cell;
   a fuel gas supply channel adapted to supply a fuel gas to the fuel cell;
   a fuel supply device adapted to open and close to control supply of the fuel gas to the fuel cell through the fuel gas supply channel;
   a circulation channel adapted to circulate a fuel off-gas discharged from the fuel cell to the fuel gas supply channel;
   a circulation pump disposed in the circulation channel and adapted to pressure-feed the fuel off-gas to the fuel gas supply channel so as to be circulated therein; and
   a control unit programmed to control operation of at least one of the fuel supply device or the circulation pump, and to determine that freezing of water is present downstream of the fuel supply device when a pressure increase gradient exceeding a freezing determination threshold is measured by a pressure sensor for three consecutive open/closed cycles of the fuel supply device,
   wherein when freezing of water is detected to be present downstream of the fuel supply device, the control unit relatively increases a proportion of an amount of the fuel gas to be supplied from the circulation pump to an amount of the fuel gas to be supplied from the fuel supply device.

2. The fuel cell system according to claim 1, wherein the pressure sensor is disposed downstream of the fuel supply device and upstream of a portion where the fuel gas supply channel and the circulation channel merge in the fuel gas supply channel, wherein the control unit is adapted to presume that freezing of water is present downstream of the fuel supply device from a degree of an increase in a pressure obtained from the pressure sensor.

3. The fuel cell system according to claim 1, wherein when freezing of water is detected to be present downstream of the fuel supply device, the control unit increases an amount of the fuel gas to be supplied from the circulation pump, and when clogging due to freezing of water is further detected to be present downstream of the fuel supply device, the control unit halts operation of the fuel supply device.

4. The fuel cell system according to claim 1, wherein when freezing of water is presumed to be present downstream of the fuel supply device, the control unit increases a target value for a refrigerant temperature of a refrigerant to be supplied to the fuel cell.

5. The fuel cell system according to claim 1, wherein the fuel gas supply channel and the circulation channel are connected via a T-shaped connecting pipe, such that the circulation channel is orthogonal to the fuel gas supply channel, and the fuel supply device is disposed upstream of the portion where the fuel gas supply channel and the circulation channel merge in the fuel gas supply channel.

6. The fuel cell system according to claim 1, further comprising an injector in the fuel gas supply channel and a pressure sensor downstream of the injector;
   wherein the control unit determines that freezing of water is present downstream of the fuel supply device when a pressure increase gradient exceeding a freezing determination threshold is measured by the pressure sensor.

* * * * *